United States Patent Office 3,288,562
Patented Nov. 29, 1966

3,288,562
METHOD OF PREPARING PHOSPHOTUNGSTIC ACID
John M. Laferty, Jr., Towanda, Pa., assignor to Sylvania Electric Products Inc., a corporation of Delaware
No Drawing. Filed Oct. 29, 1962, Ser. No. 233,930
1 Claim. (Cl. 23—140)

This invention relates to a method for preparing phosphotungstic acid and more particularly to an improved method for preparing phosphotungstic acid which is relatively uncontaminated by the presence of sodium.

Heretofore, a commonly employed procedure for preparing phosphotungstic acid has involved, first, the preparation of an aqueous solution of sodium tungstate and disodium phosphate. The pH of this solution then is slowly adjusted to a value of between 1 and 2 by the gradual addition to the solution of a mineral acid such as hydrochloric acid. The sodium salt thus formed is separated from the solution by crystallization and is redissolved in water. This latter solution then is extracted with ethyl ether and pure phosphotungstic acid is crystallized from the ether solution. Although material of a high degree of purity has been produced in this manner, the yield is low and the process becomes complicated by the necessity for employing ether as a solvent in the one step of the operation.

It also has been proposed to obtain phosphotungstic acid by passing a solution of a sodium phosphate and sodium tungstate directly in contact with a suitable cation exchange resin, the effluent from this operation containing the phosphotungstic acid. Although this operation would appear relatively simple, it has been found unsatisfactory in certain respects. In particular, the phosphotungstic acid crystals obtained on evaporation of the effluent solution contain appreciable quantities of sodium. Typically, the phosphotungstic acid produced in this manner contains $Na_2O$ in amounts of the order of 1.2%. Furthermore, the reduction of the pH value of the solution containing the tungstate salt as the solution is subjected to the cation exchange step causes the precipitation of substantial quantities of tungstic acid, $H_2WO_4$, on the cation exchange resin surfaces. This tungstic acid represents a reduction in the yield efficiency of the process and causes inactivation of the exchange resin. Additionally, the regeneration of the resin is made substantially more difficult. These objections to the process have been avoided in part by starting with relatively dilute solutions of the sodium tungstate and sodium phosphate, e.g., solutions containing total solids in amounts of from 1 to 6%. However, it is obvious that this expedient reduces the effectiveness of the process since large volumes of solution must be handled to produce a small quantity of product.

It is, therefore, an object of this invention to provide a method for preparing phosphotungstic acid containing relatively small quantities of sodium ion as an impurity.

It is a further object of the invention to provide a method for preparing phosphotungstic acid involving the use of a cation exchange resin, which method permits the introduction into contact with the resin of solutions of substantially higher solids content than heretofore has been practical.

In accomplishing the foregoing and other objects of the invention, an aqueous solution of sodium metatungstate is prepared, phosphoric acid is added to convert the sodium metatungstate to sodium phosphotungstate, and the solution then is brought into contact with a cation exchange resin to exchange the sodium ion, thus converting the sodium phosphotungstate to phosphotungstic acid.

In its more specific aspects the method contemplates particular procedures for preapring the sodium metatungstate, and separation of the desired phosphotungstic acid from the solution.

In one embodiment of the process sodium tungstate is dissolved in water and tungstic acid, $H_2WO_4$ is added to the solution in an amount at least stoichiometrically sufficient to react with the sodium tungstate in the subsequent digestion step to form sodium metatungstate in the solution. The mixture of tungstic acid and the tungstate solution then is maintained for a short time at an elevated temperature, conveniently at between about 70° and 100° C., to cause reaction of the tungstic acid with the sodium tungstate in the solution. At the end of this digestion step a sludge consisting nearly entirely of excess undissolved tungstic acid is present with the solution. This sludge is removed, as by filtration, the resulting clear solution containing sodium metatungstate. Sufficient phosphoric acid to convert the sodium metatungstate to sodium phosphotungstate then is added to the solution and the solution next is brought into contact with a suitable cation exchange material to replace the sodium ion in the dissolved salt with hydrogen ion. This contact preferably is accomplished by passing the solution through a column filled with the ion exchange material. However, the contact can also be accomplished by dispersing the ion exchange material in the sodium phosphotungstate solution contained in a vessel and, after allowing sufficient time for the material to exchange the sodium ions present, recovering the resulting acid solution by filtration. The desired phosphotungstic acid then may be readily recovered from the solution, if desired, by concentration and crystallization. Typically, the amount of sodium present in the crystalline acid so produced is extremely low, i.e., of the order of less than 0.05% measured as $Na_2O$.

Various well known types of inorganic or organic cation exchange materials including processed clays, gel zeolites, sulphonated phenolic resins, petroleum sludges, and the like, may be used in the present process. However, it has been found that a particularly effective material for the purpose is an 8% cross-linked sulphonated polystyrene divinyl benzene sold by Diamond Alkali Co. as Duolite C–20 resin.

An important advantage of the present process, in contrast to certain of the procedures previously known, is in the fact that the solution subject to the cation exchange treatment may be relatively concentrated, so that the problem of handling large volumes of materials is substantially reduced. More particularly, the sodium phosphotungstate in the solution supplied to the cation exchange material is relatively soluble, and furthermore even at high concentrations of the salt there is little or no tendency for the relatively insoluble tungstic acid to form as the pH of the solution is decreased by contact with the cation exchange material. As a consequence, the cation exchange step can be carried out using solutions containing 30% or more solute. Solutions of from about 20% to about 30% concentration have been found particularly suitable. The process can be operated using more concentrated solutions but special provision may then be necessary since the cation exchange material will float in the higher specific gravity solutions. Lower concentration solutions, e.g., 10% solute or less, may also be employed, but much of the efficiency of the process is lost thereby. The precise concentration af the solution in the embodiment of the invention just discussed is of course determined by the quantity of sodium tungstate in the starting solution and the amount of tungstic acid added to the solution prior to the digestion step.

In another embodiment of the invention sodium tungstate in aqueous solution may be treated with a mineral acid such as, for example, hydrochloric acid, to convert the sodium tungstate to the corresponding metatungstate salt. To prevent formation of tungstic acid with resulting loss of product and contamination of the solution with insoluble material, the hydrochloric acid is added very slowly until the solution reaches a pH in the range of from about 3 to about 5, and the solution simultaneously is maintained at an elevated temperature, preferably between about 70° and 100° C. After this digestion operation has been completed phosphoric acid is added to the solution to convert the metatungstate ion to the phosphotungstate ion in the solution. The solution then is brought into contact with a cation exchange material in the manner described above in connection with the first embodiment of the invention. If desired, the resulting phosphotungstic acid may be crystallized from the solution after completion of the cation exchange step of the process.

In order that those skilled in the art better may comprehend the process described, illustrative examples of the process are set forth below.

Example I

A solution of 103 g. of sodium tungstate,

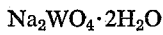
$$Na_2WO_4 \cdot 2H_2O$$

in 600 ml. of water was heated to about 90° C., and 347 g. of tungstic acid, $H_2WO_4$ was added to the heated solution. Only a portion of the tungstic acid dissolved imediately, and heating of the suspension of the balance of the tungstic acid in the solution was continued for about 15 minutes at about 90° C. The suspension was agitated continuously during this digestion operation. In the presence of the excess tungstic acid the sodium tungstate was converted to sodium metatungstate,

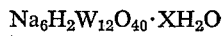
$$Na_6H_2W_{12}O_{40} \cdot XH_2O$$

Undissolved tungstic acid was filtered from the sodium metatungstate solution and 17.3 g. of phosphoric acid (85% $H_3PO_4$) was added to the clarified solution. The resulting solution of sodium phosphotungstate was diluted to a specific gravity of 1.290 (about 30% solids content) and the diluted solution was passed through an ion exchange column packed with Duolite C-20 resin on the hydrogen cycle at the rate of about 25 ml./minute. After the sodium ion content had been exchanged from the solution by contact with the resin it was concentrated by evaporation and the phosphotungstic acid was crystallized out. The crystalline product analyzed 92.1% $WO_3$, 2.6% $P_2O_5$, 5.3% $H_2O$ and less than 0.05% $Na_2O$.

Example II

A solution obtained by dissolving 103 g. of

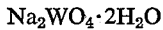
$$Na_2WO_4 \cdot 2H_2O$$

in 400 ml. of water was heated to 70°–80° C. With the solution maintained at this temperature, and continuously agitated, 38% HCl was added slowly until the solution reached a pH of about 4. At this point the tungsten was present as sodium metatungstate, and 5.7 g. of 85% phosphoric acid was added to the solution to convert the sodium metatungstate to sodium phosphotungstate. Upon addition of the phosphoric acid, the pH of the solution decreased to about 2.0 and the specific gravity was about 1.200. This solution then was passed through an ion exchange column packed with Duolite C-20 resin on the hydrogen cycle, and the phosphotungstic acid was crystallized from the effluent solution as in Example I. Upon analysis the crystalline product proved to be of the following composition: 92.5% $WO_3$, 2.5% $P_2O_5$, 4.6% $H_2O$ and less than 0.05% $Na_2O$.

As will be noted from the foregoing examples of the method of the invention, the phosphotungstic acid produced was contaminated only slightly by the presence of sodium ion. Furthermore, no problem was created in the use of the cation exchange resin by precipitation of insoluble tungstic acid and the resin in each case was readily reactivated by the simple procedure of acid washing.

The phosphotungstic acid obtainable through the use of the novel process herein described is useful as a component of hydration and dehydration catalysts in chemical processes. The low content of sodium ion in the compounds produced, therefor, is of particular significance, for the reason that sodium is known in many cases as a poison to the activity of catalysts of this type.

What is claimed is:

A method for the production of phosphotungstic acid which comprises preparing an aqueous solution of sodium tungstate, heating the solution to a temperature between about 70° and 100° C., maintaining the solution at said temperature and slowly adding hydrochloric acid thereto until the solution reaches a pH value of from about 3 to about 5 to convert the sodium tungstate to sodium metatungstate, adding sufficient phosphoric acid to the solution of sodium metatungstate to convert the sodium metatungstate to sodium phosphotungstate, and thereafter passing the solution in contact with a cation exchange material on the hydrogen cycle to remove sodium ions therefrom and to convert the sodium phosphotungstate to phosphotungstic acid.

References Cited by the Examiner

UNITED STATES PATENTS 2,503,991  4/1950  Bechtold _____ 23—140

OTHER REFERENCES

Jacobson et al.: Encyclopedia of Chemical Reactions, vol. 8, Reinhold Publishing Corp., New York, 1959, pages 33 and 35.

Liberti: Annali di Chimica (Rome), vol. 43, No. 7, November 1953, pages 443–447.

Samuelson: Ion Exchangers in Analytical Chemistry, John Wiley & Sons, Inc., New York, 1953, pages 117–132.

OSCAR R. VERTIZ, *Primary Examiner*.

H. T. CARTER, *Assistant Examiner*.